United States Patent Office 3,574,041
Patented Apr. 6, 1971

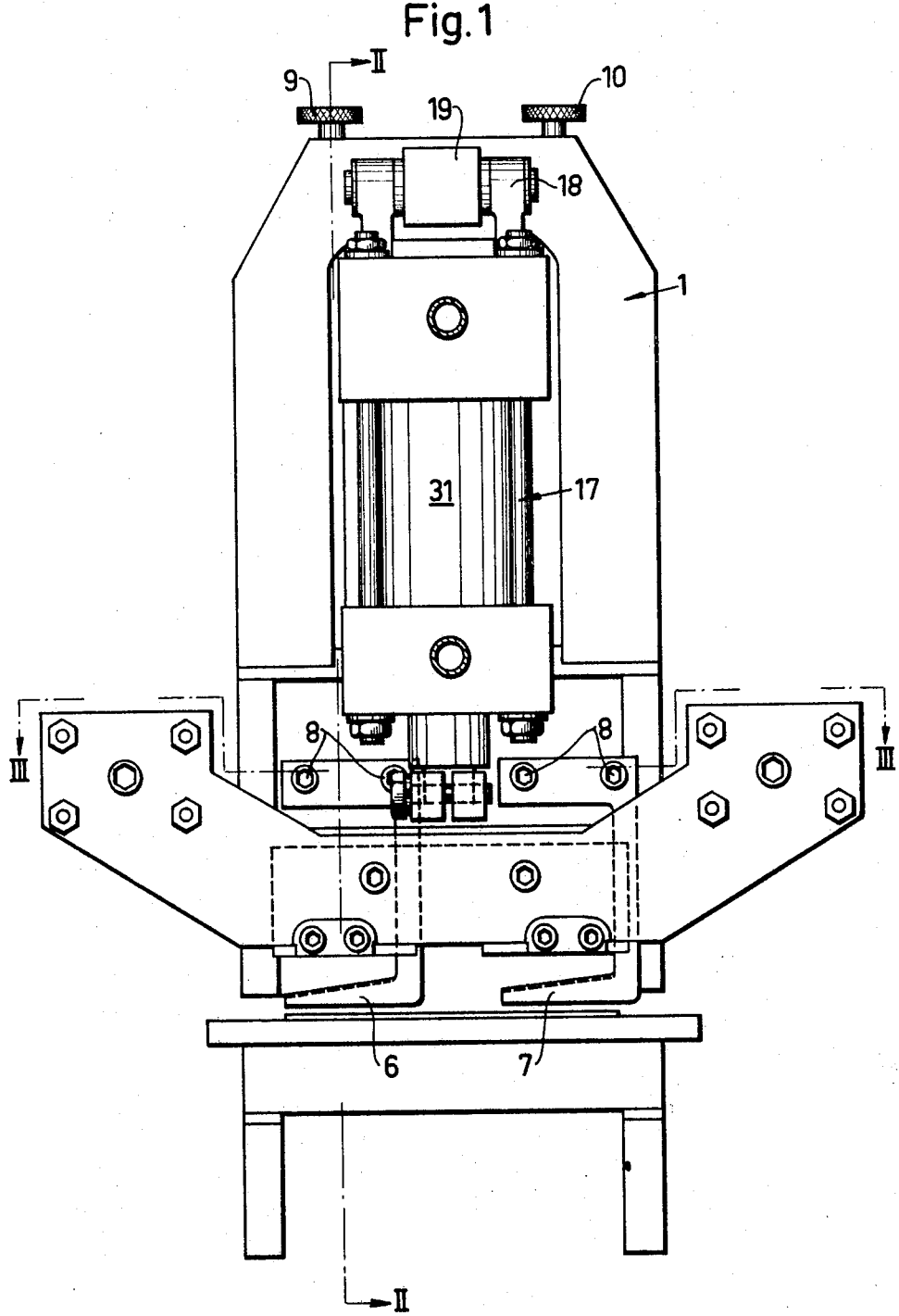

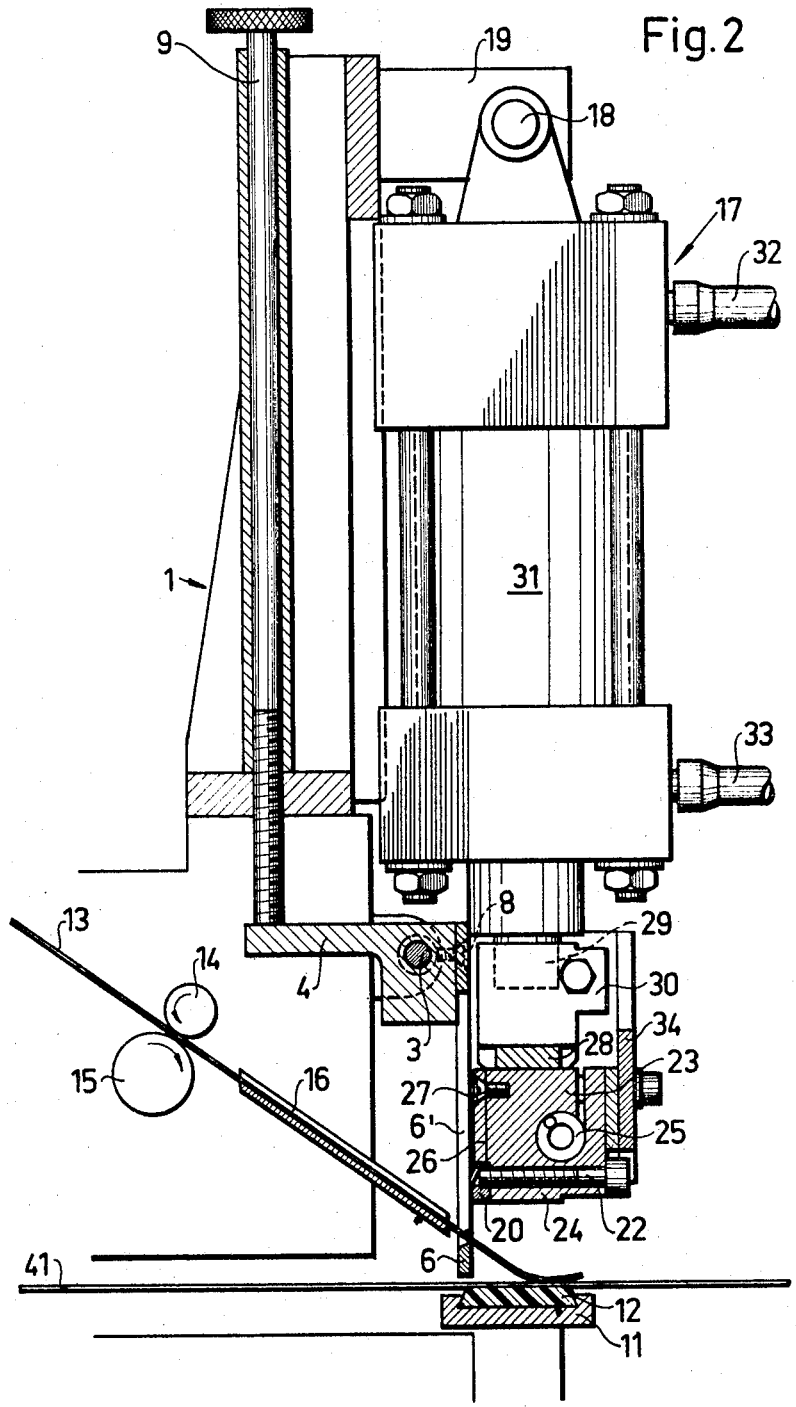

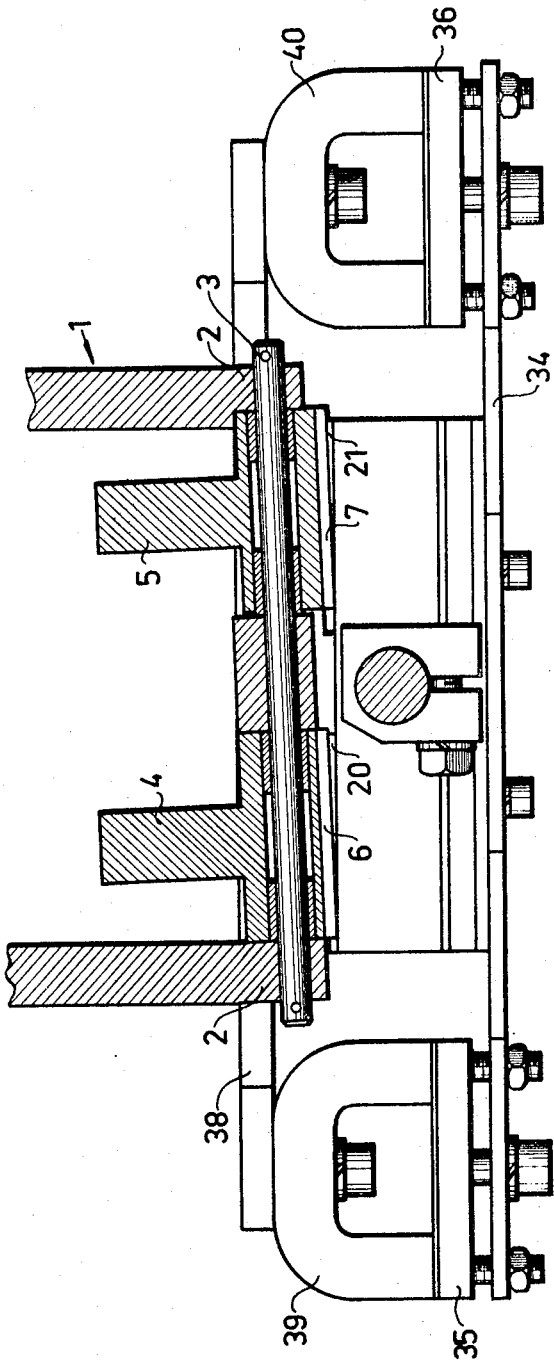

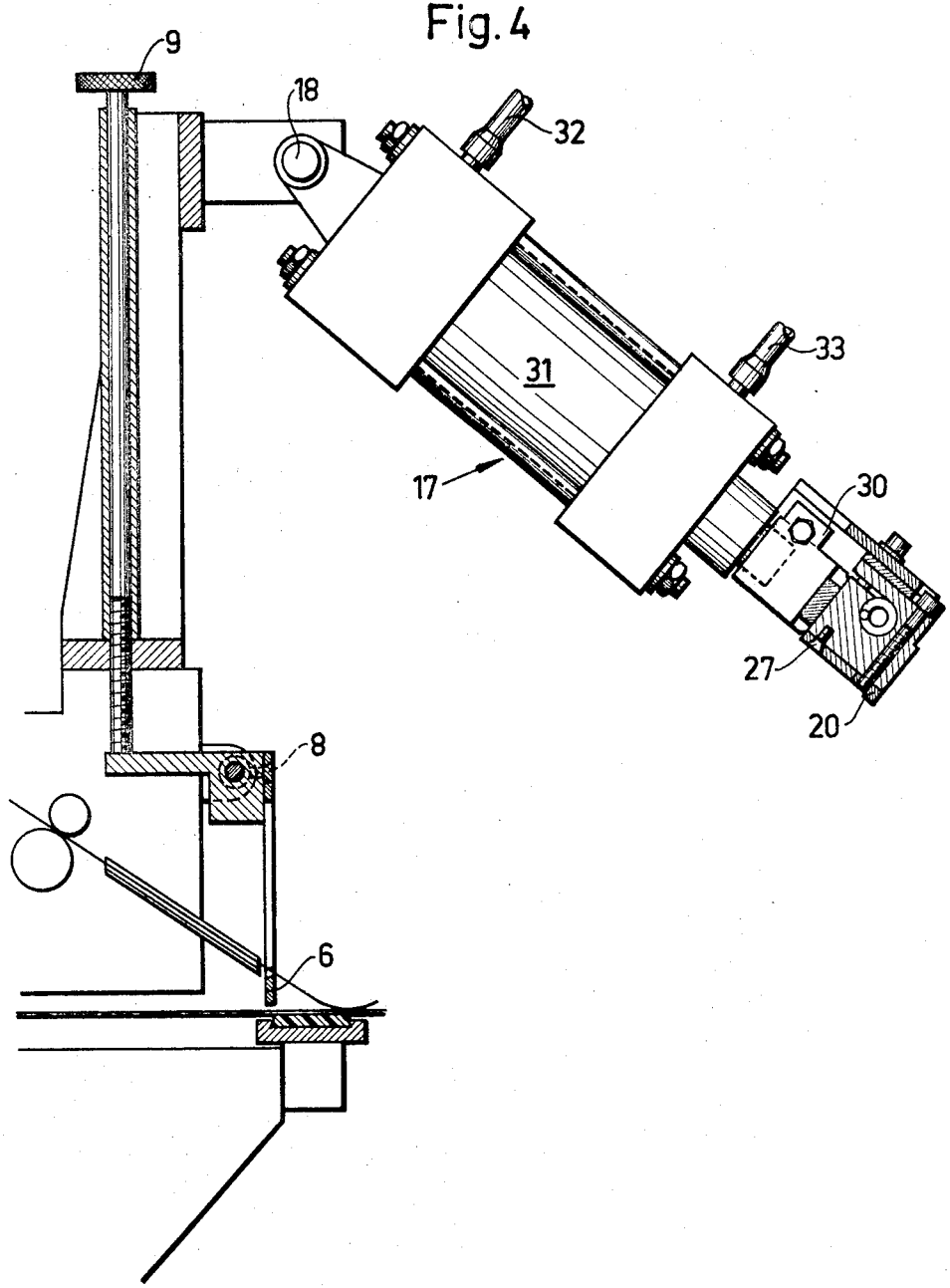

---

3,574,041
STRIP CUTTING AND AFFIXING APPARATUS
Hans-Georg Wilhelm Melle, Lund, Sweden, assignor to AB Tetra Pak, Lund, Sweden
Filed Aug. 5, 1968, Ser. No. 750,263
Claims priority, application Sweden, Aug. 7, 1967, 11,188/67
Int. Cl. B32b 31/18; B26d 5/08
U.S. Cl. 156—522                                              1 Claim

ABSTRACT OF THE DISCLOSURE

Apparatus to sever and heat seal a strip of material to a web of material using a fixed cutter blade and movable cutter blade with the movable cutter blade being capable of movement away from and toward the fixed cutter blade without readjustment of the relative positions of the blades.

---

This invention is concerned with a device for cutting off pieces of a strip and for affixing the cut-off pieces to a packaging material by means of heat sealing. The device comprises a fixed cutter blade, a movable cutter blade, a contact heating unit and a unit which transmits motion to the movable cutter blade and the contact heating unit.

The invention is in the first place characterized by the movable cutter blade, the contact heating unit and the moving mechanism being made into one unit, which by means of a joint, a sliding rod arrangement or similar apparatus is attached to a fixed frame in order to allow, during times when the apparatus is not in service, the unit to be removed from, and to be returned to, the fixed cutter blade, without the position of the unit relative to the fixed cutter blade being thereby put out of adjustment.

A further purpose of the invention is that the movable cutter blade shall be capable of being pressed against the fixed cutter blade with a constant force, that is, on the whole independent of the wear of the cutter blade, and that it should be possible to carry out the removal of the unit comprising the movable cutter blade and the contact heating unit without previous loosening of connections. In order that this wish may be satisfied, the invention is characterized by the said unit under operating conditions having its movable cutter blade pressed against the fixed cutter blade by magnetic force, spring force, etc.

A preferred form of the invention is further characterized by the cutter blades being paired and by the removable unit being capable of rotation around an axis, the direction being the same as the direction of cut of the cutter blades. This arrangement results in the advantage that the two movable cutter blades of the unit can be made to bear against the respective fixed cutter blades with the same force.

Further characteristics and advantages of the invention will be manifest from the following, reference being made to the attached drawings, in which FIG. 1 shows a front view of the invention as per a preferred form of this, FIG. 2 is Section II—II of FIG. 1, FIG. 3 is Section III—III of FIG. 1, and FIG. 4 shows the device with the removable unit swung away from the fixed cutter blade.

1 in the figures generally denotes a frame structure with a number of projections, two of which have been denoted 2. A pin 3, which carries the two cutter carrier arms 4 and 5 in such a way that these are capable of rotation, runs through projections 2. The noncutting legs 6' and 7' of the two fixed cutter blades 6 and 7 respectively are by means of screws 8 affixed to cutter carrier arms 4 and 5. The adjustment of cutter blades 6 and 7 can be altered by means of set screws 9 and 10 which are accessible above the apparatus. As can be seen easily, cutter blade 6 will for instance be carried forward a little if set screw 9 is screwed down.

A striker base 11 with a rubber plate 12 also forms part of the fixed installation. The strips that are to be cut off have been denoted 13 and are driven by the drive rollers 14 and 15. Feed channel 16 for the strips 13 is fitted between drive rollers 14 and 15 and the cutter blades. A web-shaped packaging material is denoted 41.

An upper projection 19 is also affixed to the frame 1. A removable unit, which is generally denoted 17, is attached to this projection by means of a hinge 18. This unit comprises the following principal components: two movable cutter blades 20 and 21, a contact heating unit 23 with a hot plate 24, and a hydraulic piston 31 which causes the motion of the cutter blades 20 and 21 and the contact heating unit 23. The movable cutter blades 20, 21 are fixed onto the contact heating unit 23 with the aid of screws 22 and 27 and of a front plate 26. The contact heating unit 23 and thereby its hot plate 24 are heated by means of an electrical element 25, the connecting leads of which are not shown in the drawings. The contact heating unit 23 is insulated from a piston 29 by means of an insulator 28 which is held onto the piston 29 with the aid of a clamp 30. The function of the hydraulic ram 31 is to displace the freely rotatable piston 29 in the vertical direction. The lower components, which are carried by piston 29 and retained by the clamp 30 onto this, are thus also freely rotatable around the axis of the piston. This is of considerable significance, since the two movable cutter blades 20 and 21 can by this means always be caused to bear against the respective fixed cutter blades 6 and 7. The pressure hoses for the hydraulic fluid are denoted 32 and 33.

An arm 34, which carries two iron plates 35 and 36, is further screwed onto the contact heating unit. An arm 38 is in the corresponding manner screwed on to the frame 1; this arm carries two permanent magnets 39 and 40 opposite the iron plates 35 and 36, the iron plates being set to lie a little distance away from the respective magnet.

The apparatus is meant to work in the following way. A web-shaped packaging material 41, FIG. 2, is in a discontinuous manner fed forward in a direction at right angles to the plane of the figure. The packaging material has in it holes which are to be covered by the pieces of strip to form pull tabs. A cycle of operations may be said to begin by the packaging material being fed forward so that a hole is caused to be situated beneath each strip 13. While the packaging material 41 is being fed forward, the strips 13 are also fed forward a lesser amount, so that pieces of the correct length can be cut off by means of the cutter blades. Hydraulic fluid is now forced into the ram system 31 so that the piston 29 moves downward. The movable cutter blades 20, 21 for a start slide along the legs 6' and 7' respectively of the fixed cutter blades, after which the cutters cut off the strips 13. The cut-off lengths of strip are then pressed by the base plate 24 against the packaging material, which is coated with plastic, and are with the aid of heat affixed onto this in such a way that they cover the holes in the material. The movable cutter blades 20, 21 and the contact heating unit 23 then return to the initial position, as a result of hydraulic fluid being forced into the other pressure hose 33.

A suitable bearing pressure between the cutter blades is obtained with the aid of magnetic force. As the cutters become worn down, the movable cutter blades advance a corresponding amount automatically, this being made possible by means of the flexible coupling between the magnets 39, 40 and the iron plates 35, 36. If a larger alteration of the adjustment of the cutters is necessary, this can be carried out by means of the set screws 9 and 10.

If the cutter blades are to be replaced or some other more extensive repair is to be carried on the equipment, it may be necessary to make screws 8 and 27 accessible. This may in accordance with the invention be carried out quite simply by swinging out unit 17 as a whole, in the way shown in FIG. 4. There is no need for any prior dismantling or other complicated measures for this purpose. When the alteration has been carried out, the unit is taken back to its original position, and the cutter blades automatically assume the correct positions in relation to one another, this being made possible by virtue of the fact that the movable cutter blades are capable of rotating freely about the axis of piston 29.

It is naturally possible to modify the invention within the framework of the idea behind the invention. Hinge 18 may thus for instance be replaced by a sliding rod arrangement which will allow unit 17 to be taken off. It is probable however that the apparatus would thereby lose its easy manoeuvrability. Further, spiral springs can for instance be made use of instead of the magnets 39 and 40. Easy manoeuvrability would in such a case also be reduced, however. These examples show however that the invention is not restricted by the preferred form of the invention but only by the following patent claim.

That which is claimed is:

1. Apparatus to sever and heat seal a strip of material to a web of packaging material comprising: a frame, means mounting a first cutting blade in a fixed position in said frame, a second frame, a second cutting blade mounted in said second frame and operably associated with said first cutting blade, a heating unit mounted in said second frame and means mounting said second frame relative to said first frame to allow said second frame to be moved away from and returned to said first frame without altering the relative position of said first cutting blade to said second cutting blade, said first frame including a magnet means holding said second cutting blade in operative relationship with said first cutting blade.

References Cited
UNITED STATES PATENTS

| | | | |
|---|---|---|---|
| 2,255,846 | 9/1941 | Grammer | 83—582 |
| 2,351,868 | 6/1944 | Morgan | 83—564X |
| 2,687,819 | 8/1954 | Hill et al. | 156—521X |

SAMUEL FEINBERG, Primary Examiner

J. M. HANLEY, Assistant Examiner

U.S. Cl. X.R.

83—582